(12) United States Patent
Kaskawitz (10) Patent No.: US 9,043,957 B2
(45) Date of Patent: Jun. 2, 2015

(54) MOVABLE DOOR APPARATUSES AND METHODS FOR A COMBINATION GRASS DISCHARGE AND MULCHING LAWNMOWER

(75) Inventor: Scott J. Kaskawitz, Burlington, NC (US)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 13/281,086

(22) Filed: Oct. 25, 2011

(65) Prior Publication Data

US 2013/0097987 A1     Apr. 25, 2013

(51) Int. Cl.
*A01D 67/00*     (2006.01)
*A01D 42/00*     (2006.01)

(52) U.S. Cl.
CPC ............... *A01D 67/00* (2013.01); *A01D 42/00* (2013.01)

(58) Field of Classification Search
USPC ........................................................ 56/320.2
See application file for complete search history.

(56) References Cited

U.S. PATENT DOCUMENTS

| | | | |
|---|---|---|---|
| 4,633,658 A * | 1/1987 | Nogawa | ........................... 56/255 |
| 5,179,823 A | 1/1993 | Pace | |
| 5,205,112 A | 4/1993 | Tillotson et al. | |
| 5,402,629 A * | 4/1995 | Masaru | ........................... 56/17.2 |
| 6,735,932 B2 | 5/2004 | Osborne | |
| 6,751,937 B2 | 6/2004 | Kobayashi et al. | |
| 6,843,048 B2 | 1/2005 | Osborne | |
| 6,862,875 B2 | 3/2005 | Iida et al. | |
| 6,971,224 B1 | 12/2005 | Hancock | |
| 6,990,793 B2 | 1/2006 | Osborne et al. | |
| 7,093,415 B2 | 8/2006 | Kallevig et al. | |
| 7,174,700 B2 | 2/2007 | Chenevert et al. | |
| 7,204,073 B1 | 4/2007 | Chenevert | |
| 7,249,450 B2 | 7/2007 | Iida et al. | |
| 7,367,174 B2 | 5/2008 | Grimwade | |
| 7,571,593 B2 | 8/2009 | Kucera et al. | |
| 7,574,852 B1 | 8/2009 | Loxterkamp et al. | |
| 7,624,562 B2 | 12/2009 | Kallevig et al. | |
| 7,677,022 B2 | 3/2010 | Chenevert et al. | |
| 7,805,920 B2 | 10/2010 | Hurst et al. | |

FOREIGN PATENT DOCUMENTS

| | | |
|---|---|---|
| EP | 1 752 035 B1 | 3/2009 |
| EP | 1 504 647 B1 | 8/2009 |
| WO | WO 2010/140904 | 12/2010 |

* cited by examiner

*Primary Examiner* — Thomas B Will
*Assistant Examiner* — Mai Nguyen
(74) *Attorney, Agent, or Firm* — Jenkins, Wilson, Taylor & Hunt, P.A.

(57) ABSTRACT

Apparatuses and methods for changing the mode of operation for a lawnmower can include a door assembly having a shutter door pivotably movable with respect to a discharge opening of the lawnmower between a closed position in which it obstructs the discharge opening and an open position in which the discharge opening is substantially unobstructed. A handle can be positioned adjacent to an upper surface of the mower deck of the lawnmower and coupled to the shutter door, wherein the handle is pivotably movable with respect to the upper surface to cause movement of the shutter door. A locking member can be positioned between the handle and the upper surface, the locking member being movable with respect to the handle and operable to retain the handle in one of a plurality of predetermined positions corresponding to the closed positions and open position of the shutter door.

17 Claims, 8 Drawing Sheets

MOVABLE DOOR APPARATUSES AND METHODS FOR A COMBINATION GRASS DISCHARGE AND MULCHING LAWNMOWER

TECHNICAL FIELD

The subject matter disclosed herein relates to lawnmowers. More particularly, the subject matter disclosed herein relates to apparatuses and methods for use with lawnmowers that can change the mode of operation for a lawnmower convertible between mulching and side- or rear-discharge modes.

BACKGROUND

A number of options exist for managing grass clippings produced by a lawnmower. One option is to collect the clippings in a bag or other container and remove the clippings. Bagging has the advantage of removing clippings from a lawn entirely, leaving a very clean-looking lawn. Bagging does require, however, time to empty the bag and dispose of the clippings. In addition, removing the clippings from the lawn can deprive the remaining grass of the benefit of the nutrients contained in the clippings (e.g., nitrogen, water). As a result, additional fertilizer treatments may be needed to account for the removal of these nutrients.

Another similar option is to discharge the grass clippings away from the lawnmower. This option requires less equipment (e.g., bagging system), and eliminates the need to empty bags. Rather, the clippings can just be left to fertilize the yard. If the grass clippings are relatively short, this option can provide aesthetically acceptable results, but if the clippings are too long, however, they can be considered unsightly when left on the lawn. Alternatively, the clippings can be collected after the fact, but such collection creates many of the same problems as bagging with regard to disposing of the clippings.

A third option is to mulch the clippings for reincorporation into the lawn, thereby eliminating the need to dispose of grass clippings. In addition, mulching can help to provide the soil with increased ground cover to hold moisture, and the mulched clippings can act as a fertilizer. There are also disadvantages, however, to mulching systems. For instance, mulching can require special blades or a specifically-designed housing shape. Also, if the grass is particularly tall, thick, or wet, mulching systems can put high strains on the lawnmower because of the high volume and/or high density of the clippings.

It is inconvenient, however, to selectively use multiple types of lawnmowers for their respective suitable uses. It is therefore desirable for a lawnmower to be convertible between multiple modes to allow the operator to select the mode of operation best suited for a particular situation. Such convertible designs have been developed, but most designs require the attachment of separate components to use the lawnmower in either a side or rear discharge mode (e.g., an attachable discharge chute) or in a mulching mode (e.g., a mulch plate or mulch plug), which can be easily misplaced or cumbersome to install. Alternatively, convertible designs can include shutter systems that are integrated into the lawnmower, but these systems tend to involve complex mechanisms and can be less effective at performing the desired functions than components that are dedicated to the particular mode of operation. Accordingly, no current design allows for an easy, convenient, and effective mechanism for changing a lawnmower between operating modes.

SUMMARY

In accordance with this disclosure, novel apparatuses and methods for changing the mode of operation for a lawnmower are provided. In one aspect, a door assembly for use with a lawnmower can comprise a mower deck defining an upper surface, a lower interior surface, and a discharge opening in communication with the lower interior surface is provided. The door assembly can comprise a shutter door pivotably movable with respect to the discharge opening between a closed position in which the shutter door substantially obstructs flow through the discharge opening and an open position in which the discharge opening is substantially unobstructed. A handle can be positioned adjacent to the upper surface of the mower deck and coupled to the shutter door, wherein the handle is pivotably movable with respect to the upper surface of the mower deck to cause movement of the shutter door. A locking member can be movable with respect to the handle and operable to retain the handle in one of a plurality of predetermined positions corresponding to the closed positions and open position of the shutter door.

In another aspect, a lawnmower convertible between mulching and grass discharge operating modes can comprise a mower deck comprising an upper surface, a lower interior surface, and a discharge opening in communication with the lower interior surface, and a door assembly pivotably attached to the mower deck. The door assembly can comprise a shutter door pivotably movable with respect to the discharge opening between a closed position in which the shutter door substantially obstructs flow through the discharge opening and an open position in which the discharge opening is substantially unobstructed. A handle can be positioned adjacent to the upper surface of the mower deck and coupled to the shutter door, wherein the handle is pivotably movable with respect to the upper surface of the mower deck to cause movement of the shutter door, the handle comprising a plurality of recesses in a surface of the handle. A locking member can be positioned between the handle and the upper surface of the mower deck, the locking member being movable with respect to the handle, the locking member comprising one or more projections extending from a surface of the locking member towards the handle and engageable with the recesses of the handle to retain the handle in one of a plurality of predetermined positions corresponding to the closed positions and open position of the shutter door.

In yet another aspect, a method for changing the mode of operation of a lawnmower between mulching and grass discharge operating modes can comprise positioning a door assembly in one of a plurality of predetermined positions with respect to a discharge opening of a mower deck of a lawnmower, the door assembly comprising a shutter door pivotably movable with respect to a discharge opening of the mower deck, a handle positioned adjacent to an upper surface of the mower deck and coupled to the shutter door, and a locking member movable with respect to the handle. The handle can be pivoted with respect to the upper surface of the mower deck to cause movement of the shutter door, and the locking member can be moved into engagement with the handle to retain the handle in one of a plurality of predetermined positions.

Some of the objects of the subject matter disclosed herein having been stated hereinabove, and which are achieved in whole or in part by the presently disclosed subject matter, other objects will become evident as the description proceeds when taken in connection with the accompanying drawings as best described herein below

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
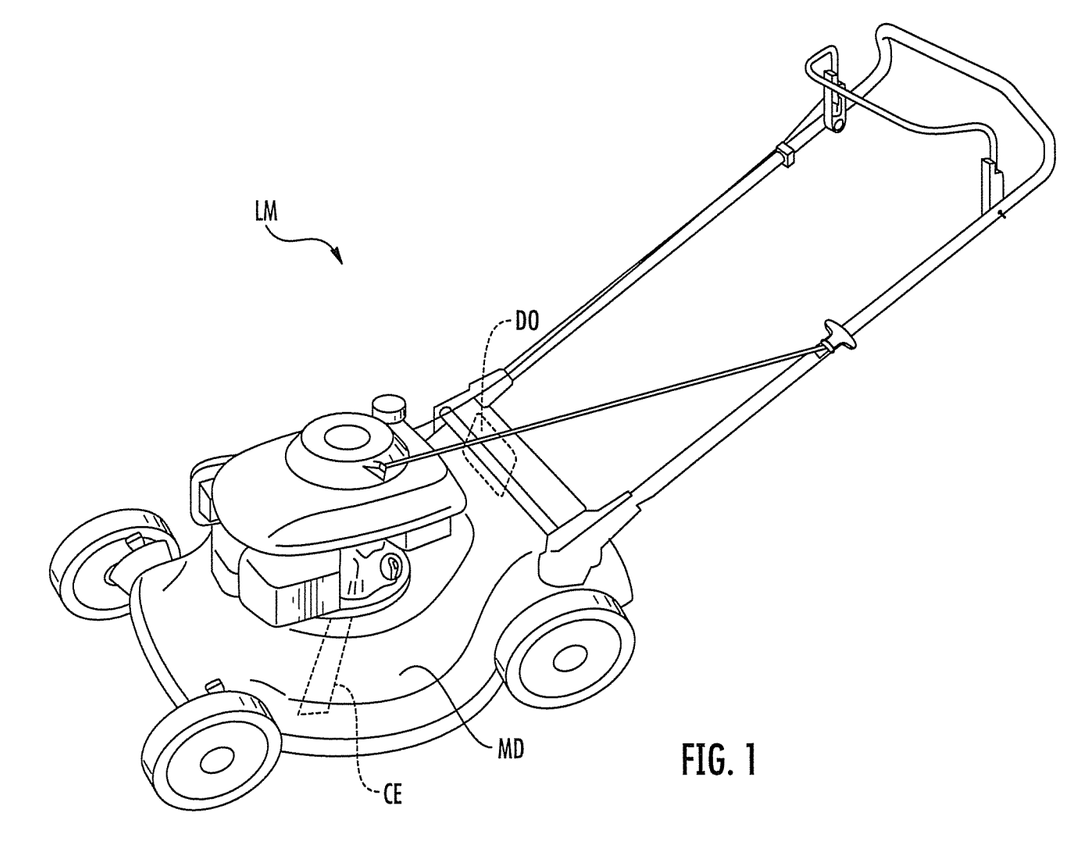
FIG. 1 is a perspective view of a lawnmower that is convertible between grass discharge and mulching operating modes according to an embodiment of the presently disclosed subject matter.

The present subject matter provides an apparatus and method for changing the mode of operation for a lawnmower. In one aspect, the present subject matter provides a lawnmower, generally designated LM, which is shown for example in FIG. 1. Lawnmower LM can include a housing, such as a mower deck MD, which can include front, side, rear, upper exterior, and lower interior portions. A suitable cutting element CE (e.g., a blade or blades) can be disposed within the lower interior portion of mower deck MD, and a discharge opening DO in mower deck MD can provide access to the lower interior portion of mower deck MD through either a side or rear portion. As discussed above, a bag or other container can be connected to discharge opening DO for collection of grass clippings discharged from lawnmower LM.

Figure 2A:
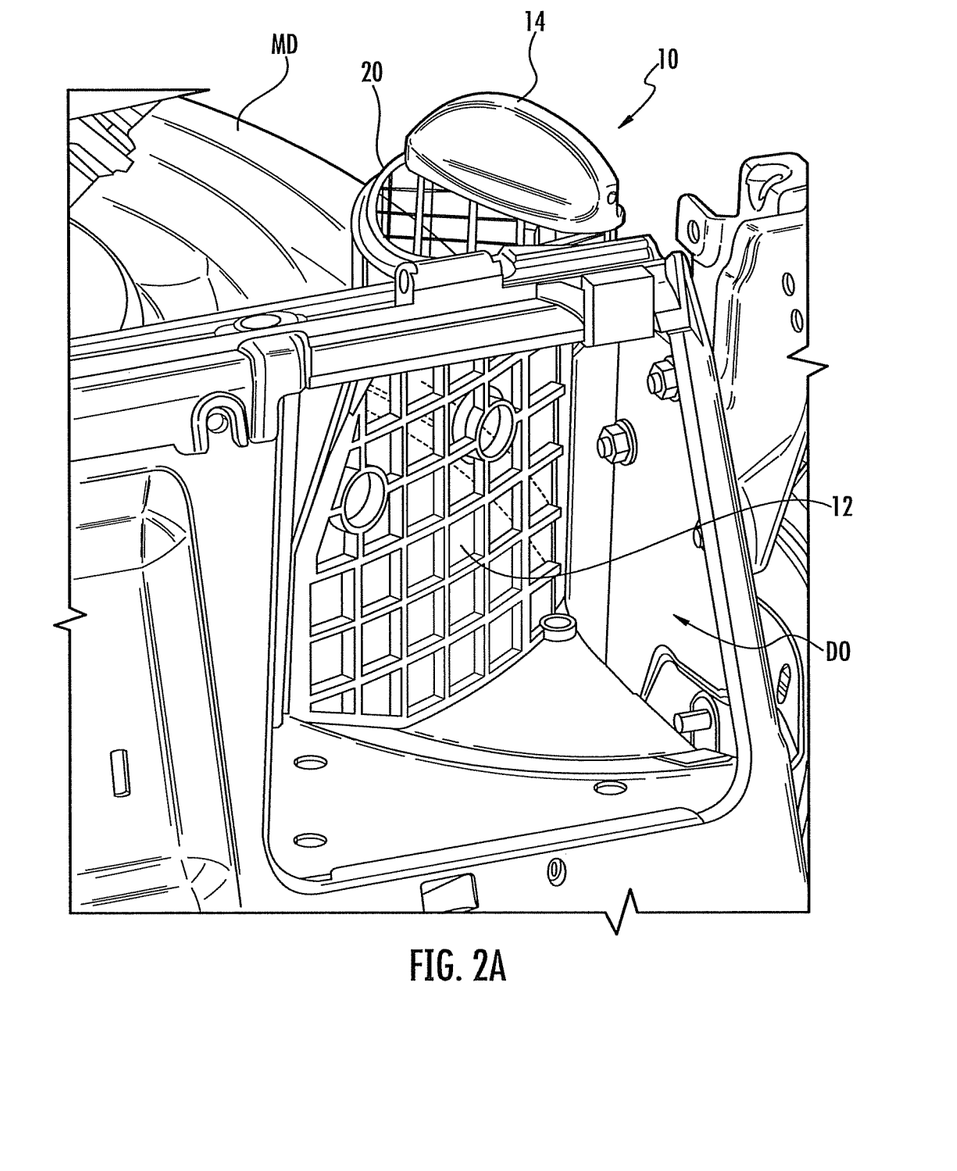
FIG. 2A is a perspective view of a movable door assembly positioned with respect to a discharge chute of a lawnmower in a first position corresponding to a mulching operating mode according to an embodiment of the presently disclosed subject matter.
Figure 2B:
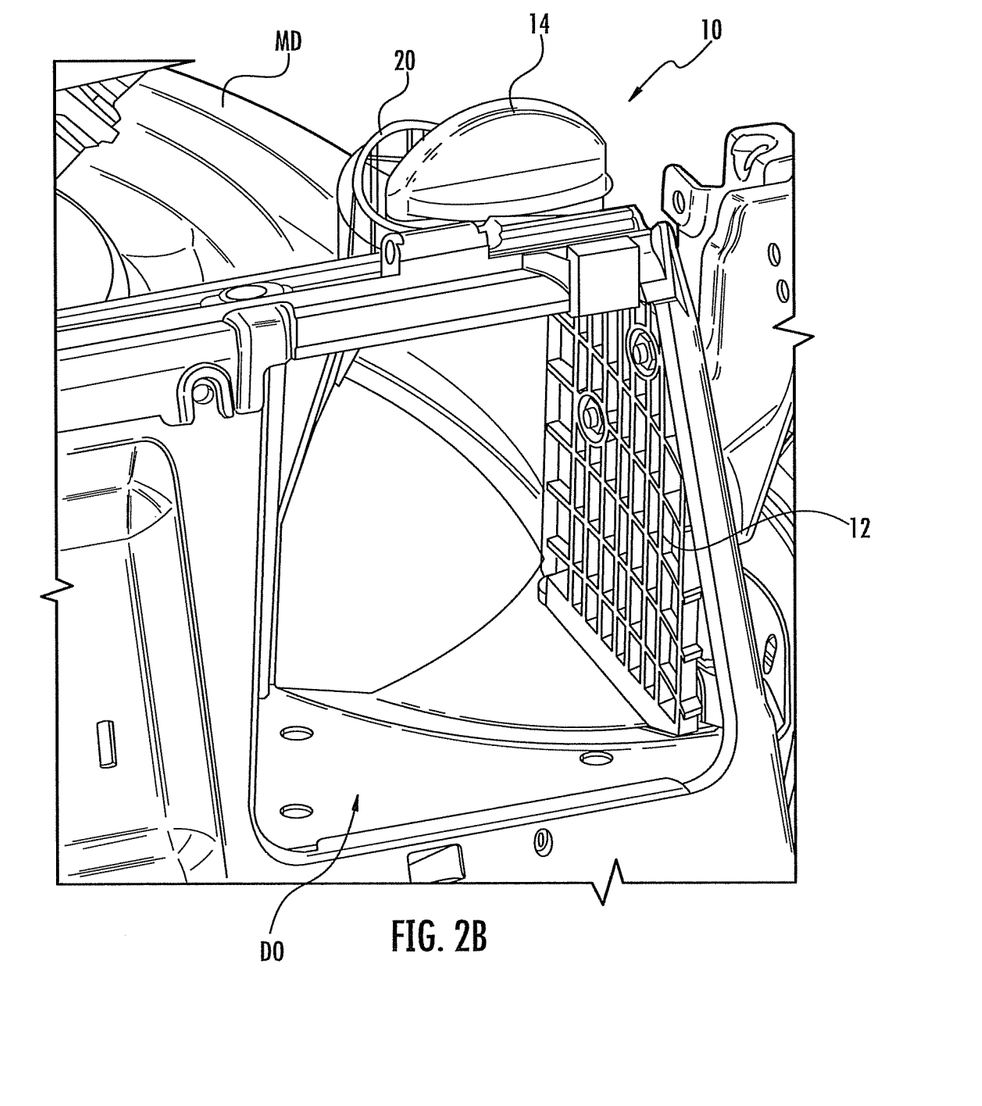
FIG. 2B is a perspective view of a movable door assembly positioned with respect to a discharge chute of a lawnmower in a second position corresponding to a grass discharge operating mode according to an embodiment of the presently disclosed subject matter.

For controlling the operation mode of lawnmower LM, a door assembly according to the present subject matter, generally designated 10, is shown for example in FIGS. 2A and 2B. Door assembly 10 can be pivotably attached to mower deck MD and can be movable among multiple positions with respect to discharge opening DO, thereby switching lawnmower LM between mulching and grass discharge operating modes. Specifically, door assembly 10 can include a shutter door 12 that is movable between a closed position shown in FIG. 2A, in which shutter door 12 is positioned or disposed across discharge opening DO to prevent grass clippings from being discharged, and an open position shown in FIG. 2B, in which discharge opening DO is substantially unobstructed to allow grass clippings to pass out of discharge opening DO. In addition, door assembly 10 can be positioned in one or more intermediate positions to allow lawnmower LM to operate in a hybrid state in which discharge opening DO is partially obstructed by shutter door 12.

Furthermore, shutter door 12 can be suitably or particularly shaped based on the desired operating conditions when shutter door 12 is in each of these positions. Specifically, shutter door 12 can be shaped such that when it is in its closed position (e.g., mulching position shown in FIG. 2A), the surface of shutter door 12 is substantially seamless with the surface of the lower interior portion of mower deck MD. In this way, when door assembly 10 is positioned for mulching operation of lawnmower LM, airflow within the lower interior portion of mower deck MD is not substantially interrupted by shutter door 12.

In addition, shutter door 12 can further be shaped such that when it is in its open position (e.g., grass discharge position shown in FIG. 2B), shutter door 12 can substantially conform to a surface of discharge opening DO. In this way, when door assembly 10 is positioned for grass discharge operation of lawnmower LM, air and entrained grass clippings directed out of the lower interior portion of mower deck MD through discharge opening DO can pass at least relatively freely through discharge opening DO.

Figure 3:
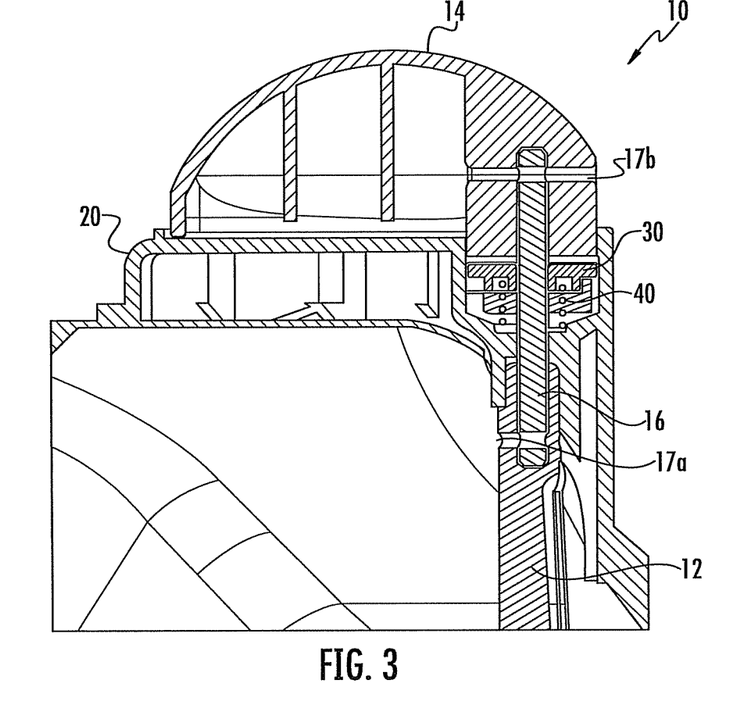
FIG. 3 is a side cutaway view of a movable door assembly according to an embodiment of the presently disclosed subject matter.

To enable the motion of shutter door 12 between its open and closed portions, door assembly 10 can comprise a handle 14 located on the upper exterior portion of mower deck MD. In particular, referring again to FIGS. 2A and 2B, handle 14 can be rotatable with respect to a cover 20 that is located generally above discharge opening DO. Referring to FIG. 3, handle 14 can be connected to shutter door 12 by a pin 16. Specifically, for example, a first hole 17a can be formed through a first end of pin 16, and a second hole 17b can be formed through an opposing second end of pin 16. These holes can correspond to complementary holes in shutter door 12 and handle 14, respectively, such that a spring pin or other device can pass through first and second holes 17a and 17b to couple pin 16 to shutter door 12 and handle 14. In this way, shutter door 12 can be positioned in discharge opening DO, handle 14 can be positioned against cover 20, and pin 16 can couple these elements together. With this configuration, movement of shutter door 12 between an open position corresponding to grass discharge operation of lawnmower LM and a closed position corresponding to mulching operation of lawnmower LM (or to a position there between) can be accomplished by pivoting handle 14 with respect to cover 20.

Figure 4:
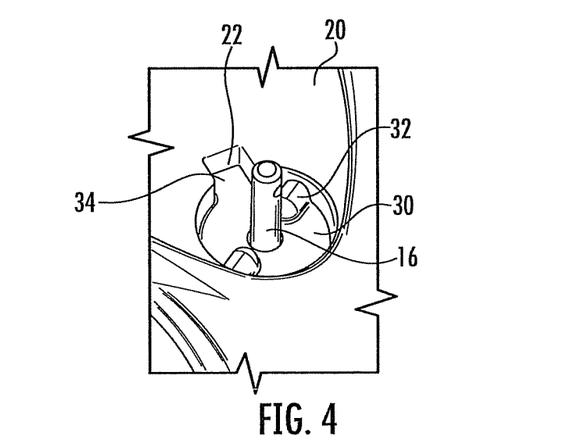
FIG. 4 is a perspective view of a locking member for use with a movable door assembly according to an embodiment of the presently disclosed subject matter.
Figure 5:
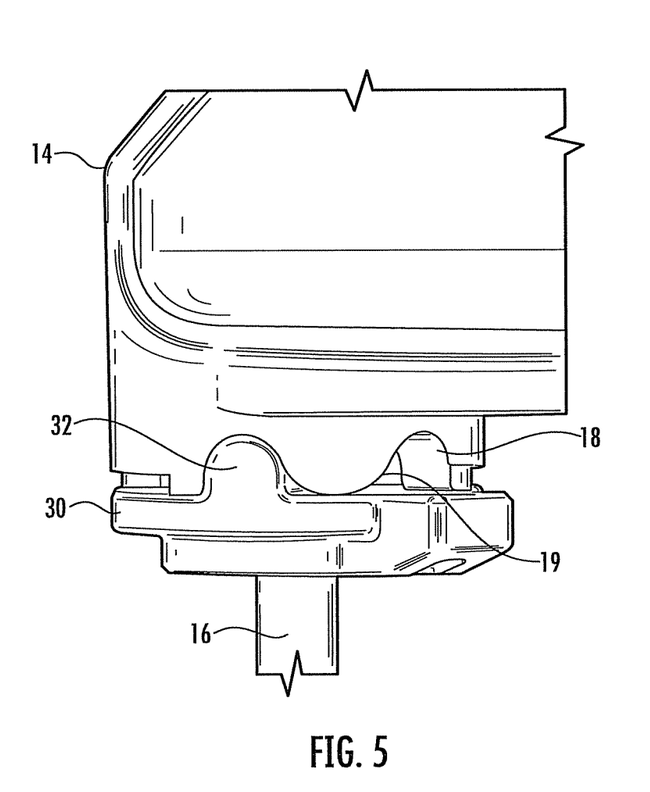
FIG. 5 is a side view of a locking member interacting with a handle of a movable door assembly according to an embodiment of the presently disclosed subject matter.
Figure 6A:
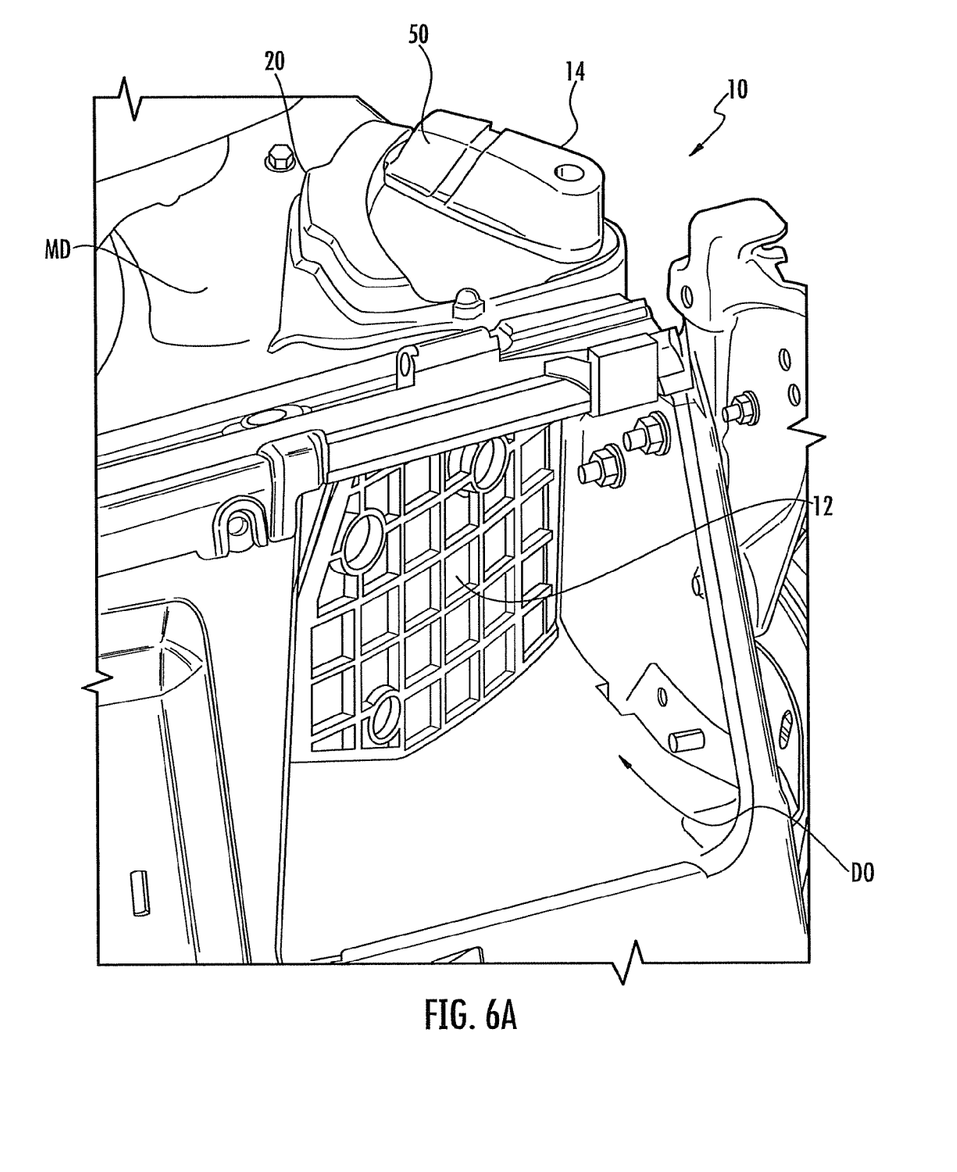
FIG. 6A is a perspective view of a movable door assembly positioned with respect to a discharge chute of a lawnmower in a first position corresponding to a mulching operating mode according to an embodiment of the presently disclosed subject matter.
Figure 6B:
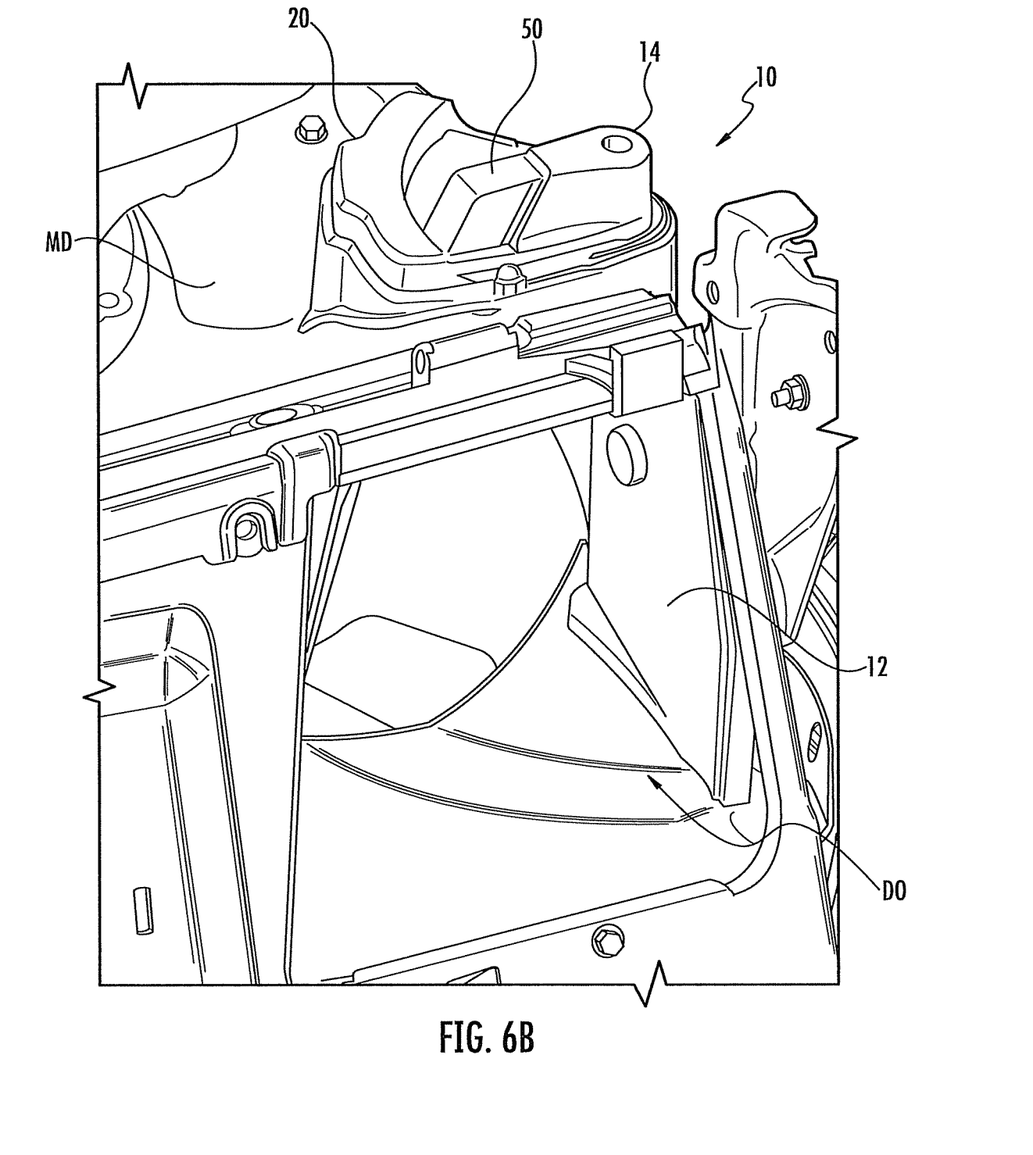
FIG. 6B is a perspective view of a movable door assembly positioned with respect to a discharge chute of a lawnmower in a second position corresponding to a grass discharge operating mode according to an embodiment of the presently disclosed subject matter.

Door assembly 10 can further be configured to prevent inadvertent movement of shutter door 12 to thereby hold shutter door 12 in a desired position. Specifically, referring to FIG. 3, a locking member 30 can be positioned between handle 14 and a comparatively fixed component of lawnmower LM (e.g., cover 20). In particular, locking member 30 can fit within an opening that extends downwards into cover 20. Locking member 30 can act as a detent that engages handle 14 to hold handle 14 in place unless a force sufficient to overcome the engagement of locking member 30 is exerted on handle 14. In one particular configuration shown in FIGS. 4 and 5, for example, locking member 30 can comprise one or more projections 32, that can for example be curved, extending from a surface of locking member 30 toward and opposing surface of handle 14. Correspondingly, handle 14 can comprise one or more recesses 18 as shown in FIG. 5 that can be substantially complementarily shaped, such as by curved surfaces as shown, to projections 32 such that projections 32 can nest into recesses 18. As shown in FIG. 3, a spring element 40 can be positioned between cover 20 and locking element 30 to bias locking element 30 towards handle 14, thereby helping to maintain engagement of projections 32 with the nearest of recesses 18.

To move between locking positions, handle 14 can be twisted about pin 16 such that projections 32 are moved from one set of recesses 18 to another. To assist movement of handle between locking positions, handle 14 can define curved cam surfaces 19 between each of recesses 18. When handle 14 is twisted about pin 16, cam surfaces 19 can exert a force on projections 32. This force can cause locking member 30 to move away from handle 14 against the bias of spring element 40, allowing projections 32 to ride up on cam surfaces 19 and slide toward the next of recesses 18. As projections 32 approach the next of recesses 18, spring element 40 can exert an axial force to urge projections 32 into engagement with recesses 18, thereby locking handle 14 in the next locking position.

To prevent locking member 30 from rotating with handle 14 during this motion, locking member can be specifically configured such that it is prevented from rotating. Specifically, for example, as shown in FIG. 4, locking member 30 can have a shape that corresponds to the shape of the opening in cover 20. In the particular configuration shown in FIG. 4, cover 20 can comprise a notched opening 22, and locking member can comprise a locking tab 34 that is complementarily shaped to the shape of notched opening 22. It should be recognized, however, that any of a variety of non-cylindrical shapes for locking member 30 can be used to prevent rotation. In this way, locking member 30 can be free to travel in an axial direction along pin 16, but locking member 30 can be prevented from rotating in place about pin 16.

The positions of projections 32 on locking member 30 and recesses 18 on handle 14 can be configured to correspond to the desirable operating positions for shutter door 12. Specifically, for example, the positions of projections 32 and recesses 18 can be configured such that when projections 32 are engaged with a first set of recesses 18, shutter door 12 can be in an open position, and when projections 32 are moved to a second set of recesses 18, shutter door 12 can correspondingly be moved to a closed position. In this regard, the number of recesses 18 provided in handle 14 can be equal to the number of positions in which it is desirable for handle 14 to be locked multiplied by the number of projections 32. For example, in the configuration shown in FIGS. 4 and 5, locking member 30 can comprise two projections 32 that are evenly spaced across from each other on an upward-facing surface of locking member 30, and an opposing surface of handle 14 can include four recesses 18. In this arrangement, handle 14 can be moved between two different positions, which for example can correspond to open and closed positions for shutter door 12. As discussed above, however, it should be recognized that additional recesses 18 can be provided in handle 14 to allow door assembly 10 to be locked in one or more intermediate positions to allow lawnmower LM to operate in a hybrid state in which discharge opening DO is partially blocked by shutter door 12.

Figure 7:
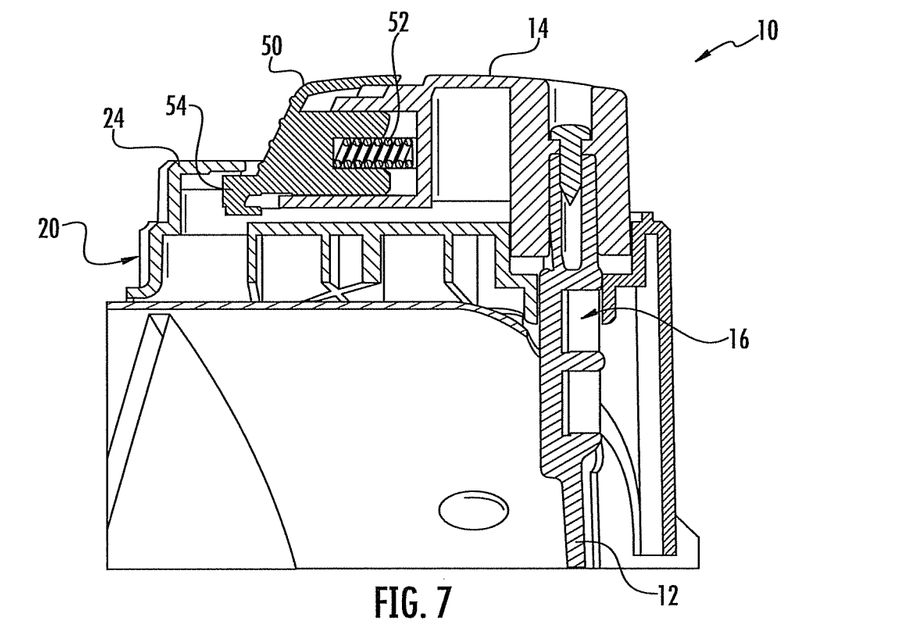
FIG. 7 is a side cutaway view of a movable door assembly according to an embodiment of the presently disclosed subject matter.

In an alternative configuration for door assembly 10 shown in FIGS. 6A through 8, handle 14 can still be rotatable with respect to a cover 20 that is located generally above discharge opening DO. Handle 14 can again be connected to shutter door 12 by a pin 16, which can be a separate element as shown in FIG. 3, or it can be formed integrally with shutter door 12 as shown in FIG. 7. Handle 14 can be connected to pin 16 by a spring pin or other device. For example, as shown in FIG. 7, pin 16 can be received in a recess in a bottom surface of handle 14, and a screw can be used to secure the two components together. Regardless of the specific configuration and connection, handle 14 can be designed to interact with shutter door 12 (e.g., via pin 16) such that movement of shutter door 12 between an open position corresponding to grass discharge operation of lawnmower LM (See, e.g., FIG. 6A) and a closed position corresponding to mulching operation of lawnmower LM (See, e.g., FIG. 6B) or to a position therebetween can be accomplished by pivoting handle 14 with respect to cover 20.

Figure 8:
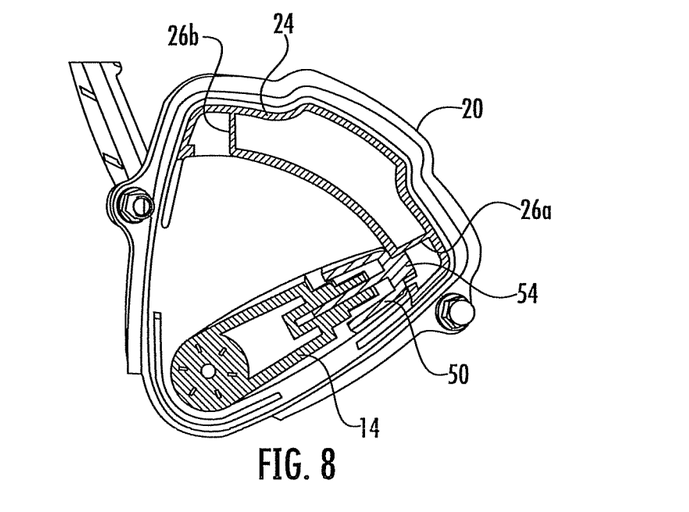
FIG. 8 is a top cutaway view of a locking member for use with a movable door assembly according to an embodiment of the presently disclosed subject matter.

In contrast to the configuration disclosed above with respect to FIGS. 3A to 5, however, the configuration for door assembly 10 shown in FIGS. 6A through 8 can be operable to secure handle 14 in one of the predetermined positions in a different manner. Specifically, rather than a locking member 30 being positioned between handle 14 and a comparatively fixed component of lawnmower LM (e.g., cover 20), handle 14 can comprise a slide lock 50 that is movable with respect handle 14 into and out of engagement with a fixed component of lawnmower LM (e.g., cover 20). In particular, as shown in FIGS. 7 and 8, handle 14 can be a substantially elongate body having a first end pivotably connected to pin 16 and slide lock 50 being connected to an opposing end of handle 14. Slide lock 50 can be slidably movable with respect to handle 14, and a lock spring 52 can be positioned therebetween for biasing slide lock 50 towards an extended position with respect to handle 14.

Cover 20 can complementarily comprise a raised portion 24 having one or more recesses formed therein. For example, as shown in FIG. 8, raised portion 24 can comprise a first recess 26a into which slide lock 50 can extend and interlock. First recess 26a can be provided such that when handle 14 is positioned such that slide lock 50 can extend into and engage first recess 26a, this positioning of handle 14 corresponds to shutter door 12 being positioned in an open position. Similarly, raised portion 24 of cover 20 can further comprise a second recess 26b positioned in raised portion 24 such that when handle 14 is moved to allow slide lock 50 to engage second recess 26b, shutter door 12 is correspondingly moved into a closed position. Of course, those having ordinary skill in the art should recognize that further recesses can be provided in raised portion 24 of cover 20 to define additional locking positions.

To move between locking positions, slide lock 50 can be moved away from raised portion 24 such that handle 14 is free to be pivoted about pin 16. Handle 14 can be twisted about pin 16 such that slide lock 50 is moved among the recesses in raised portion 24 (i.e., between first and second recesses 26a and 26b). Once slide lock 50 is aligned with one of the recesses, slide lock 50 can be moved into engagement with the recess, such as by releasing slide lock 50 and allowing lock spring 52 to press slide lock 50 into the recess. In this way, door assembly 10 can again be configured to prevent inadvertent movement of shutter door 12 to thereby hold shutter door 12 in a desired position.

In one aspect, slide lock 50 can comprise a hook 54 that can extend towards handle 14. Hook 54 can be configured with an internal cavity that can be sized to receive at least a portion of at least one internal support surface of handle 14. The at least one internal support surface of handle 14 can comprise an L-shaped cross-section, as illustrated in FIG. 7. For example, when slide lock 50 is moved away from or retracted with respect to raised portion 24, hook 54 can be brought into communication with the at least one internal support surface of handle 14, such that the at least one support surface can be configured to be received by and/or nest within the cavity of hook 54. While handle 14 twists about pin 16, hook 54 can remain retracted with respect to raised portion 24 until slide lock 50 is aligned with the desired recess. Once slide lock 50 is in alignment, lock spring 52 can press slide lock 50 into the recess, thus hook 54 can move out of communication with the at least one internal support surface of handle 14 in toward raised portion 24 and into the recess.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A door assembly for use with a lawnmower comprising a mower deck defining an upper surface, a lower interior surface, and a discharge opening in communication with the lower interior surface, the door assembly comprising:
    a shutter door pivotably movable with respect to the discharge opening between a closed position in which the shutter door substantially obstructs flow through the discharge opening and an open position in which the discharge opening is substantially unobstructed;
    a handle positioned adjacent to the upper surface of the mower deck and coupled to the shutter door, wherein a first end of the handle is pivotably movable with respect to the upper surface of the mower deck to cause movement of the shutter door; and
    a locking member being movable with respect to the handle and operable to retain the handle in one of a plurality of predetermined positions corresponding to the closed position and open position of the shutter door, wherein the locking member comprises a slide lock connected at a second end of the handle and movable with respect to the handle to engage a portion of the upper surface of the mower deck, the slide lock being configured to slide towards a pivot point of the handle to move the slide lock out of engagement with one of the predetermined positions, to pivot into alignment with a second of the predetermined positions, and then to release away from the pivot point into engagement with the second of the predetermined positions against the portion of the upper surface of the mower deck.

2. The door assembly of claim 1, wherein the shutter door is pivotable about a vertical axis.

3. The door assembly of claim 1, wherein the shutter door comprises a shape that conforms to one or both of a shape of the lower interior surface of the mower deck or of a shape of the discharge opening.

4. The door assembly of claim 1, wherein the slide lock comprises one or more projections extending from a surface of the slide lock towards the portion of the upper surface of the mower deck; and wherein the portion of the upper surface of the mower deck comprises a plurality of recesses in a surface of the portion of the upper surface of the mower deck facing the slide lock, the recesses being shaped to receive the projections.

5. The door assembly of claim 4, wherein each of the one or more projections comprises a hook extending towards the handle, and the handle comprises at least one support surface; and
    wherein each hook comprises a cavity and the at least one support surface is configured to be received by each cavity.

6. The door assembly of claim 1, wherein the slide lock is operable to retain the handle in at least one additional predetermined position corresponding to an intermediate position of the shutter door in which the discharge opening is partially obstructed by the shutter door.

7. The door assembly of claim 1, comprising a pin positioned in an opening through the mower deck, the pin comprising a first end connected to the shutter door and an opposing second end connected to the first end of the handle.

8. The door assembly of claim 1, comprising a spring element positioned between the handle and the slide lock for biasing the slide lock against the portion of the upper surface of the mower deck.

9. A lawnmower convertible between mulching and grass discharge operating modes, the lawnmower comprising:
    a mower deck comprising an upper surface, a lower interior surface, and a discharge opening in communication with the lower interior surface; and
    a door assembly pivotably attached to the mower deck, the door assembly comprising:
        a shutter door pivotably movable with respect to the discharge opening between a closed position in which the shutter door substantially obstructs flow through the discharge opening and an open position in which the discharge opening is substantially unobstructed;
        a handle positioned adjacent to the upper surface of the mower deck and coupled to the shutter door, wherein a first end of the handle is pivotably movable with respect to the upper surface of the mower deck to cause movement of the shutter door; and
        a locking member connected to the handle and movable with respect to the handle to engage a portion of the upper surface of the mower deck to retain the handle in one of a plurality of predetermined positions corresponding to the closed position and open position of the shutter door, wherein the locking member comprises a slide lock connected at a second end of the handle and movable with respect to the handle to engage a portion of the upper surface of the mower deck, the slide lock being configured to slide towards a pivot point of the handle to move the slide lock out of engagement with one of the predetermined positions, to pivot into alignment with a second of the predetermined positions, and then to release away from the pivot point into engagement with the second of the predetermined positions towards the portion of the upper surface of the mower deck.

10. A method for changing the mode of operation of a lawnmower between mulching and grass discharge operating modes, the method comprising:
    positioning a door assembly in one of a plurality of predetermined positions with respect to a discharge opening of a mower deck of a lawnmower, the door assembly comprising a shutter door pivotably movable with respect to a discharge opening of the mower deck, a handle positioned adjacent to an upper surface of the mower deck and coupled to the shutter door, and a locking member movable with respect to the handle, wherein the locking member comprises a slide lock connected at a second end of the handle and movable with respect to the handle to engage a portion of the upper surface of the mower deck;

pivoting a first end of the handle with respect to the upper surface of the mower deck to cause movement of the shutter door;

sliding the slide lock towards a pivot point of the handle to move the slide lock out of engagement with one of the predetermined positions;

pivoting the slide lock into alignment with a second of the predetermined positions; and releasing the slide lock away from the pivot point and into engagement with the second of the predetermined positions to retain the handle in the second of the predetermined positions.

11. The method of claim 10, wherein pivoting the handle to cause movement of the shutter door comprises pivoting the shutter door about a vertical axis.

12. The method of claim 10, wherein the slide lock comprises one or more projections extending from a surface of the slide lock towards the portion of the upper surface of the mower deck, and the portion of the upper surface of the mower deck comprises a plurality of recesses in a surface of the portion of the upper surface of the mower deck facing the slide lock;

wherein releasing the slide lock away from the pivot point of the handle and into engagement with the second of the predetermined positions comprises nesting each of the one or more projections in one of the plurality of recesses.

13. The method of claim 12, wherein each of the one or more projections comprises a hook extending towards the handle, and the handle comprises at least one support surface; and wherein sliding the slide lock towards the pivot point of the handle to move the slide lock out of engagement with one of the predetermined positions comprises nesting the at least one support surface within a cavity formed by the hook.

14. The method of claim 10, wherein releasing the slide lock away from the pivot point of the handle and into engagement with the second of the predetermined positions to retain the handle in the second of the predetermined positions comprises retaining the handle in one of a closed position in which the shutter door substantially obstructs flow through the discharge opening and an open position in which the discharge opening is substantially unobstructed by the shutter door.

15. The method of claim 14, wherein releasing the slide lock away from the pivot point of the handle and into engagement with the second of the predetermined positions to retain the handle in the second of the predetermined positions comprises retaining the handle in one of a closed position, an open position, or one or more intermediate positions in which the discharge opening is partially obstructed by the shutter door.

16. The method of claim 10, wherein releasing the slide lock away from the pivot point of the handle and into engagement with the second of the predetermined positions comprises applying a biasing force to the slide lock to urge the slide lock towards the portion of the upper surface of the mower deck.

17. The method of claim 16, wherein applying a biasing force comprises positioning a spring element between the slide lock and the handle.

* * * * *